United States Patent [19]
Williams et al.

[11] Patent Number: 5,348,111
[45] Date of Patent: Sep. 20, 1994

[54] WHEELED VEHICLE STEERING SYSTEM

[75] Inventors: David A. Williams, Milton Keynes; Peter G. Wright, Wymondham; David Burke, Carleton Rise, all of United Kingdom

[73] Assignee: Group Lotus PLC, Norwich, England

[21] Appl. No.: 169,742

[22] Filed: Dec. 17, 1993

Related U.S. Application Data

[63] Continuation of Ser. No. 834,323, filed as PCT/GB90/00710, May 8, 1990, abandoned.

[30] Foreign Application Priority Data

Jun. 8, 1989 [GB] United Kingdom ............... 8913212

[51] Int. Cl.⁵ .................................... B62D 6/00; B62D 7/15
[52] U.S. Cl. ................................... 180/140; 280/91; 364/424.01; 364/424.05
[58] Field of Search ............... 180/140, 141, 142, 79.1; 364/424.01, 424.05

[56] References Cited

U.S. PATENT DOCUMENTS

| | | | |
|---|---|---|---|
| 4,077,490 | 3/1978 | Casterton et al. | 180/143 |
| 4,706,771 | 11/1987 | Kawabe et al. | 180/142 |
| 4,840,389 | 6/1989 | Kawabe et al. | 280/91 |
| 4,878,557 | 11/1989 | Shibahata et al. | 180/140 |
| 4,926,954 | 5/1990 | Ataka et al. | 180/140 |
| 4,964,481 | 10/1990 | Sano et al. | 180/140 |
| 4,967,865 | 11/1990 | Schindler | 180/140 |
| 5,083,627 | 1/1992 | Kawamo et al. | 180/140 |

FOREIGN PATENT DOCUMENTS

| | | |
|---|---|---|
| 0150856 | 8/1985 | European Pat. Off. . |
| 0278366 | 8/1988 | European Pat. Off. . |
| 3734477 | 4/1988 | Fed. Rep. of Germany . |
| 60-193773 | 10/1985 | Japan . |

*Primary Examiner*—Mitchell J. Hill
*Attorney, Agent, or Firm*—Westman, Champlin & Kelly

[57] ABSTRACT

A wheeled vehicle steering system comprising an adjustable steering input device, a device for generating a first electrical signal proportional to demanded input of the steering input device, a device for steering a vehicle wheel in response to the first electrical signal, a sensing device for detecting the response of the vehicle, a device for producing a second electrical signal proportional to the detected response, an input filter for filtering the first electrical signal, a comparator device for comparing the filtered first electrical signal and the second electrical signal and producing a different signal from comparison of the first and second electrical signals, a device for steering a vehicle wheel in response to the difference signal.

13 Claims, 5 Drawing Sheets

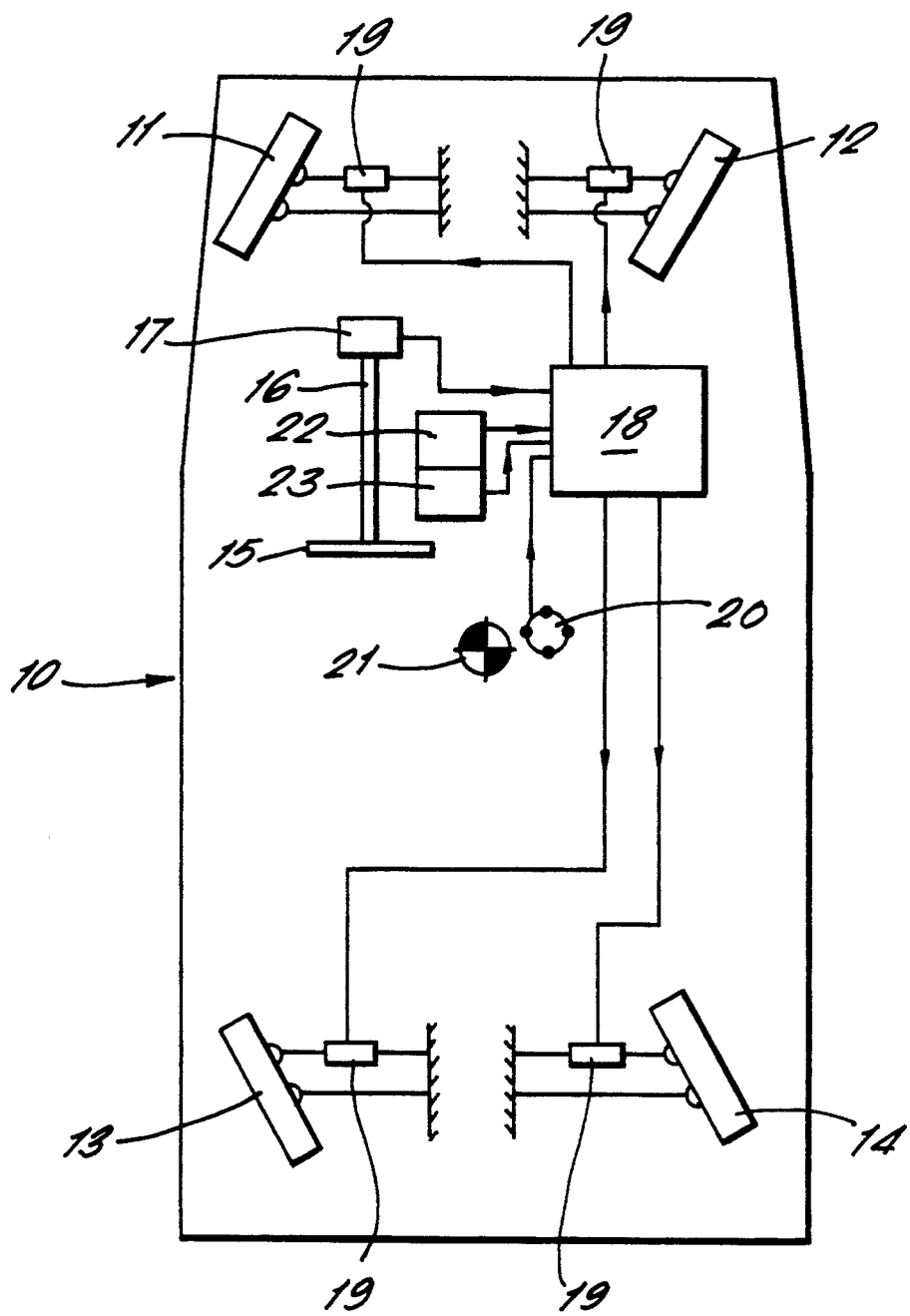

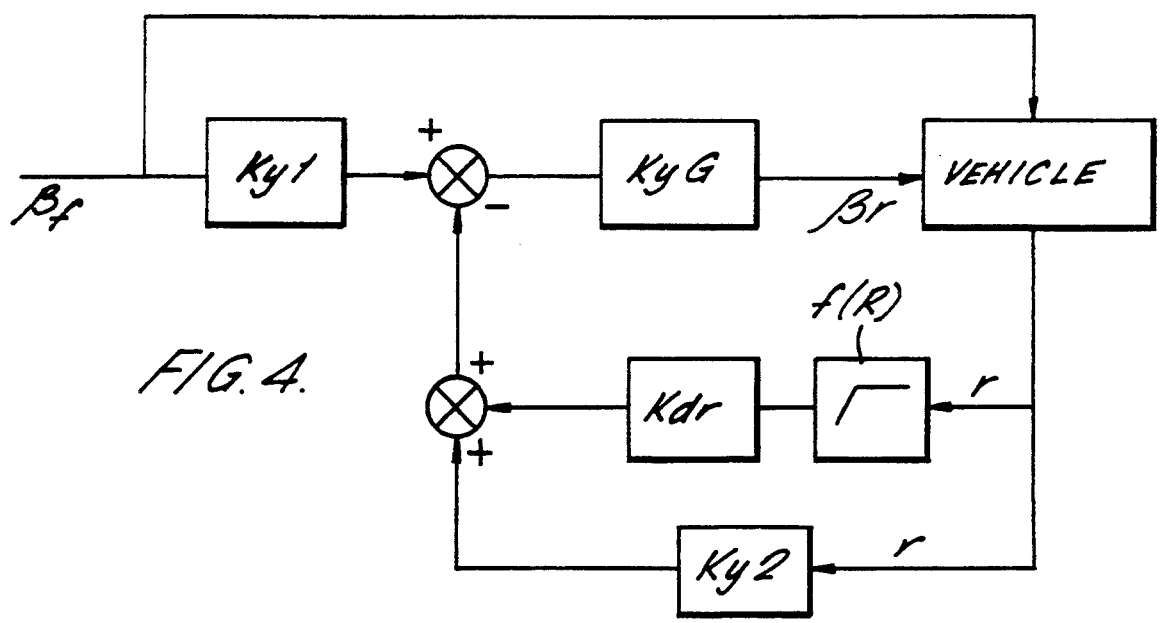
FIG. 4.
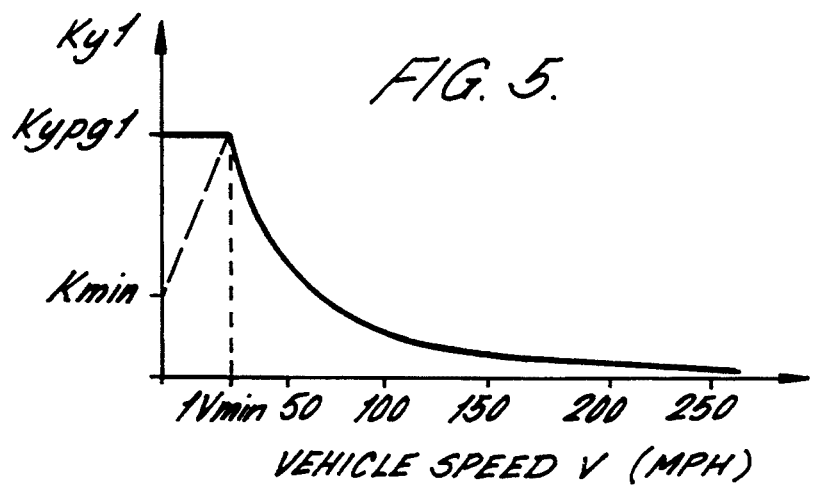
FIG. 5.
FIG. 6.
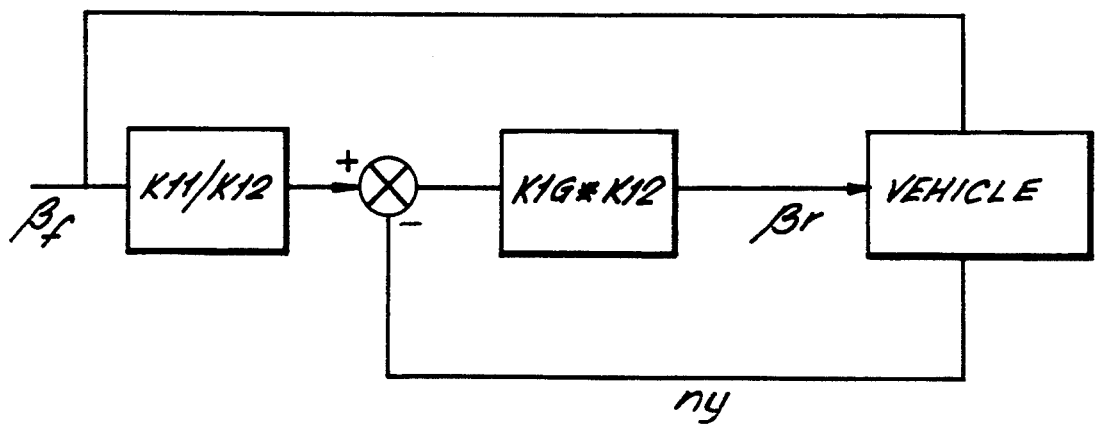

WHEELED VEHICLE STEERING SYSTEM

This is a continuation of application Ser. No. 07/834,323, filed as PCT/GB90/00710, May 8, 1990, now abandoned.

BACKGROUND OF THE INVENTION

The invention relates to a wheeled vehicle steering system. The term "wheeled vehicle" includes within its meaning motor cars, coaches, lorry cabs and trailers, tractors, trailers and semi-tracked land vehicles.

The system of the invention is particularly suitable for use in wheeled vehicles, such as motor cars, having both steerable front and steerable rear wheels.

Coventional motor cars have steerable front wheels and rear wheels which are not steerable relative to the vehicle body. Such motor cars suffer from a phenomenon known as steering angle slip, in which the angle at which the vehicle steers is less than the angle, known as the steering angle, to which the steerable wheels have been turned when the vehicle is cornering. The angle at which the vehicle steers and the steering angle are measured with respect to a longitudinal axis of the vehicle parallel to the direction of the vehicle tangential to the path followed by the vehicle.

Steering angle slip derives from the fact that the axis of rotation of a conventional motor car is not coincident with its centre of gravity. The driver of a motor car must continuously correct the steering angle in order to ensure that the vehicle follows the path which he intends it to. The vehicle steering system is therefore an open-loop, mechanical system.

There is therefore a need for a wheeled vehicle steering system of greater accuracy than known steering systems having open-loop control.

SUMMARY OF THE INVENTION

According to the invention, there is provided a wheeled vehicle steering system comprising adjustable steering input means; means for generating first electrical signal proportional to demanded input of the steering input means; means for steering a vehicle wheel in response to said first electrical signal; sensing means for detecting the response of the vehicle; means for producing a second electrical signals proportional to said detected response; wherein the means for steering the vehicle wheel in response to the first electrical signal comprises an input filter for filtering the first electrical signal; comparator means for comparing said filtered first electrical and the second electrical signal and for producing a difference signal from the comparison of the filtered first electrical signal and the second electrical signal; means for steering a vehicle wheel in response to said difference signal.

The problems associated with steering angle slip and the inaccuracy of conventional steering systems can be further alleviated by the provision of steerable rear wheels as well as steerable front wheels in a vehicle having front and rear wheels.

Such systems are now well known, and have been constructed as mechanical systems and hydraulic systems. For instance, EP-A-0225773 and U.S. Pat. No. 4,770,264 disclose a hydraulic system for steering the rear wheels of a four wheeled vehicle having front and rear wheels.

However, accurate and economical control of such rear steer systems has hitherto not been possible since suitable control laws for such a system have not previously been developed.

However, the system of the invention is particularly suitable for steering a rear wheel of a vehicle having front and rear wheels.

BRIEF DESCRIPTION OF THE DRAWINGS

A preferred embodiment of the invention will now be described with reference to the drawings, in which:

FIG. 2 is a schematic plan view of a steering system according to the invention for a road vehicle having steerable front and rear wheels;

FIG. 4 is a block diagram of a closed loop control system for use in the steering system of FIGS. 2 and 3;

FIG. 5 is a graph showing the modification of steady state lateral acceleration steering gain as a function of vehicle speed in a variation of the control system of FIG. 4a;

FIG. 6 is a block diagram for another embodiment of a closed loop control system for use in the steering system of FIG. 2;

DETAILED DESCRIPTION OF THE PREFERRED EMBODIMENTS

Referring to FIGS. 1a, 1b, 1c and 1d there is shown a schematic representation and graph showing the arrangement and characteristics of a known, open-loop control system for controlling the steering of a wheeled vehicle. In the example of FIGS. 1a to 1d, there is shown a vehicle 10 having steerable front, 11 and 12, and steerable rear, 13 and 14, wheels.

Figure 1A:
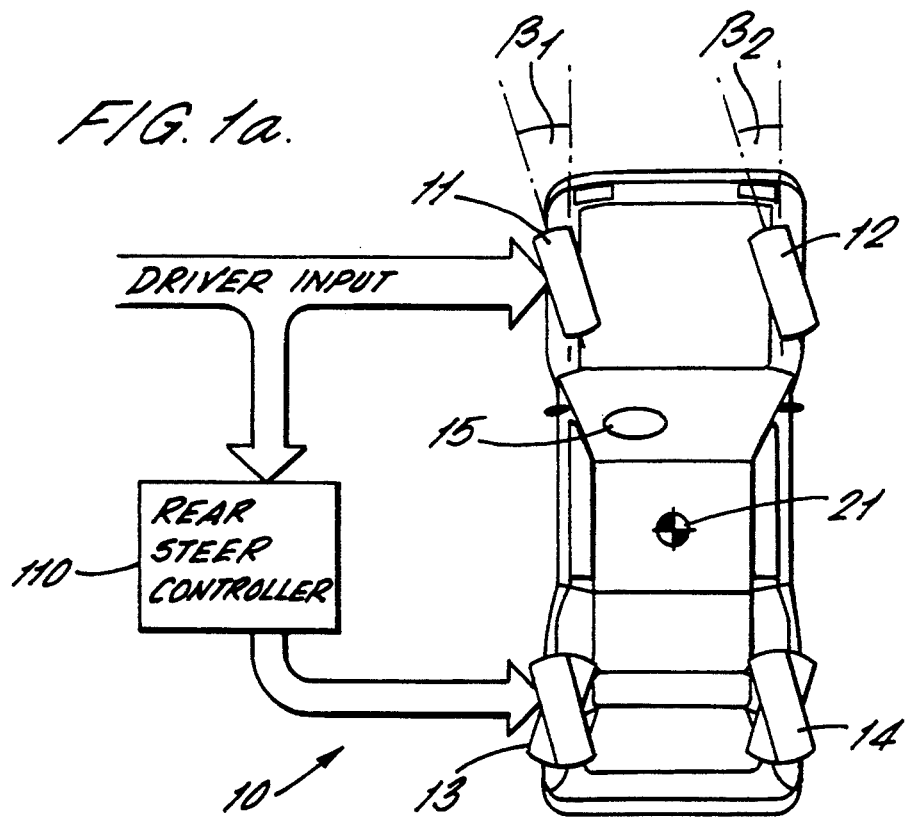
FIGS. 1a, 1b, 1c, 1d are schematic diagrams and a graph illustrating a known principle of open loop control of a wheeled vehicle steering system.
Figure 1B:
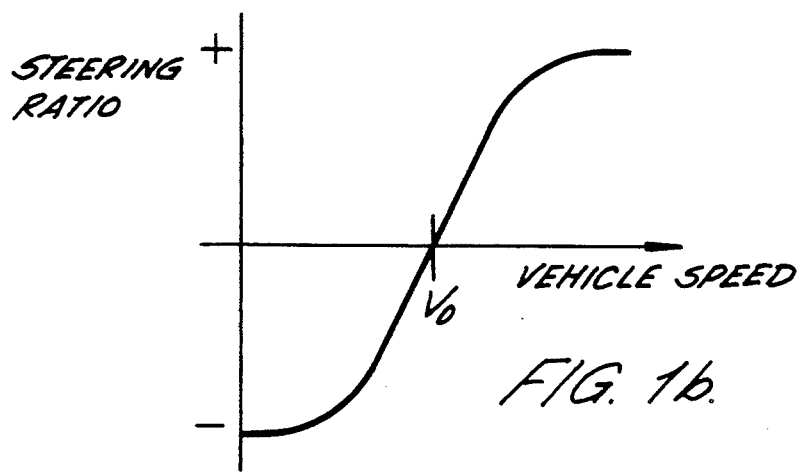

FIG. 1a illustrates the principle of open loop control whereby the rear steer angle is a fixed function of the demanded average front steering angle. The rear steer angle is unaffected by the vehicle's response and a controller 110 must be tailored to individual vehicle, tire and road conditions. FIG. 1b shows a graph with the steering ratio (i.e. rear steer angle: front steer angle) as a function of speed.

Figure 1C:
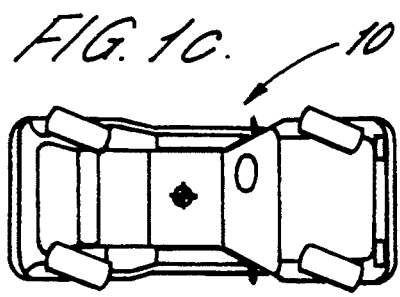
Figure 1D:
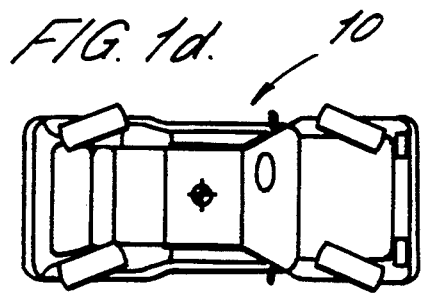

FIG. 1c illustrates the positions of rear wheels 13, 14 when the vehicle speed is greater than a predetermined speed Vc and FIG. 1d illustrates their position when the vehicle speed is less than Vc.

Thus, FIGS. 1c and 1d are schematic representations of the behaviour of the vehicle 10 as determined by FIG. 1b. Whilst some advantage is gained by use of the arrangement shown in FIG. 1a in that the center of rotation of the vehicle is made closer to the center of gravity 21 of the vehicle, since there is no check on the overall response of the vehicle 10 to the demanded front steering angle ($\beta$f), the system of FIGS. 1a to 1d does not provide fully accurate control of the vehicle.

Referring now to FIG. 2, there is shown a wheeled vehicle steering system in accordance with the invention.

As also shown in FIG. 1, a vehicle 10 has steerable front wheels 11, 12 and steerable rear wheels 13, 14.

An adjustable steering input means in the form of steering wheel 15 is mounted on a steering column 16. Means for generating a first electrical control signal in the form of sensing means 17, such as a transducer, an optical sensor or other suitable means, is mounted on the steering column 16 to measure the rotation of the steering wheel 15. This gives the demanded steering angle ($\beta$f), i.e. the angle to which the driver turns the steering wheel 15. The output of the steering sensing means 17 is supplied to a control unit 18 such as a microprocessor.

The wheels 11, 12, 13, 14 are steered by means of hydraulic actuators 19.

The actuators 19 are of a known type comprising double acting hydraulic cylinders containing a piston. One side of the piston is connected to the tie rod of a wheel through an aperture in the cylinder end wall providing mechanical connection to the wheels 11, 12, 13, 14 of a steering effort in accordance with the piston position. Control of hydraulic fluid to either side of the piston from a suitable hydraulic pressure source to effect the required steering action is through a servo-valve which is responsive to control signals from the control unit 18.

The front wheels 11, 12 may be controlled mechanically in a known manner if preferred, through mechanical coupling to the steering wheel 15.

Preferably a separate actuator 19 is used to control each wheel 11, 12, 13, 14 although with suitable adaptations to the actuators 19 each of the axial pairs of wheels 11, 12 and 13, 14 may be controlled by a single actuator 19.

Sensing means for detecting the response of the vehicle, in the form of a yaw rate sensor 20 such as a gyrometer or other suitable device, are mounted on the vehicle 10 as near to the center of gravity 21 of the vehicle 10 as possible to measure the yaw rate (r) of the vehicle 10. The yaw rate (r) is the angular velocity of the vehicle body 10 about a vertical axis through its center of gravity 21. The output of the gyrometer 20 is also supplied to the control unit 18.

A vehicle speed sensor 22 such as an optical sensor is mounted on the vehicle 10 and its output is supplied to the control unit 18.

A vehicle acceleration sensor 23 of a suitable type is also mounted to the vehicle 10 to measure the lateral acceleration of the vehicle 10 and its output is supplied to the control unit 18.

The front wheels 11, 12 are steered by control signals from the control unit 18 activating the servo valves and actuators 19 according to the demanded steer angle ($\beta$f) measured by the steering sensing means 17 at the steering column 16.

The rear wheels 13, 14 are also steered by control signals from the control unit 18 in a similar manner as described above, but the control unit 18 may be programmed to implement a variety of control schemes utilizing the output signals from one or more of the various sensing means 17, 20, 22, 23 to control the actuators 19 to effect the steering of the rear wheels 13, 14.

Open loop control systems may be used to control the steering of the rear wheels 13, 14, but the major disadvantage of such systems lie in the lack of feedback from the vehicle 10 itself so that the steering takes no account of the vehicle response to the front and rear steer inputs.

The use of closed loop or response feedback control systems to control the steering of the rear wheels 13, 14 provides a better and faster way of controlling the handling characteristic of the vehicle 10 than open loop systems.

A response feedback control system is a control system which tends to maintain a prescribed relationship of one system variable to another by comparing functions of these variables and using the difference as a means of control.

The difference between open and closed loop control is illustrated by comparison between FIGS. 1a, 1b, 1c, 1d and FIGS. 3a, 3b and 3c.

Figure 3A:
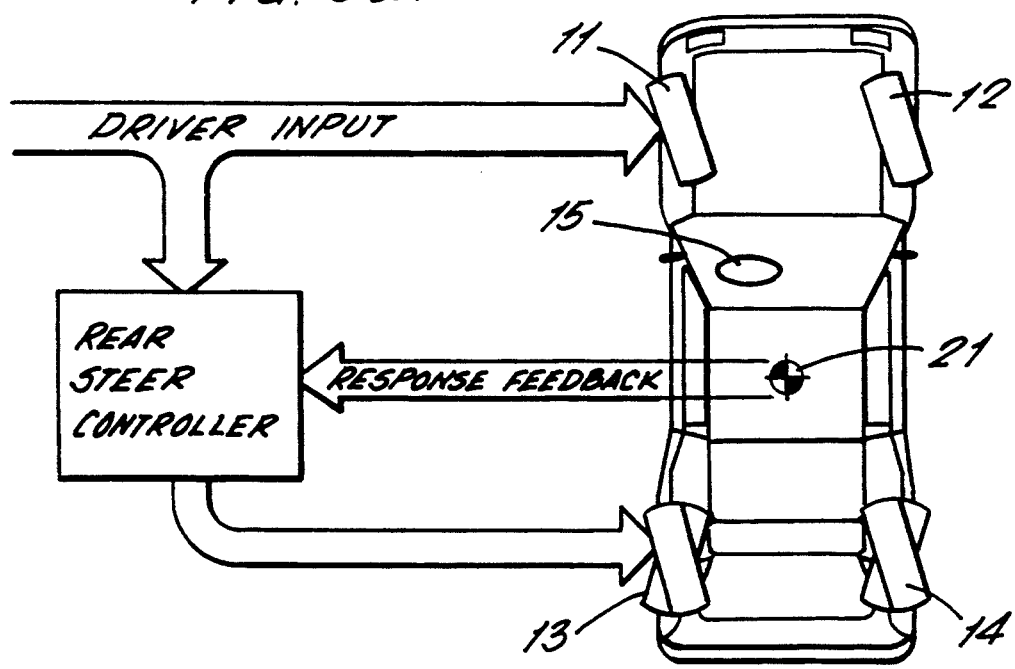
FIGS. 3a, 3b, 3c are schematic diagrams illustrating the principle of closed loop control for use in the steering system of FIG. 2.

FIG. 3a shows the principle of closed loop control whereby the driver input becomes a demanded vehicle response irrespective of vehicle speed. The rear steer angle ($\beta$r) is a function of the error between the demanded and actual vehicle response and the system can be used to modify the vehicle response. The closed loop algorithm which derives the rear steer angle ($\beta$r) can be used to control the transient as well as the steady state response of the vehicle. Stability and therefore safety can be improved as the system will react to external disturbances therefore reducing driver work load.

Figure 3B:
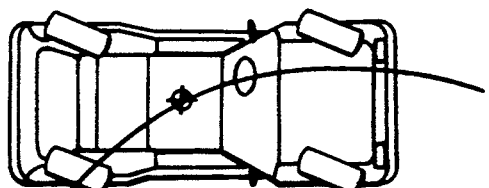
Figure 3C:
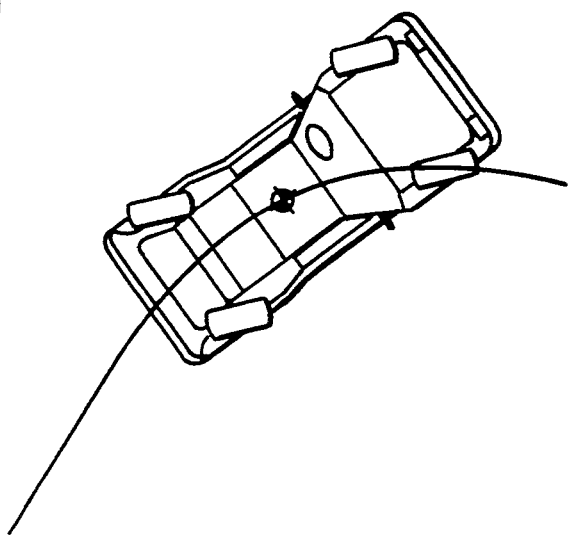

FIG. 3b demonstrates the position wherein the demanded response is less than actual response (oversteer) and FIG. 3c shows the position wherein the demanded response is greater than actual response (understeer). A preferred embodiment of the control system utilises a yaw rate (r) error loop.

Yaw Rate (r) Error Loop Control

In this embodiment of the invention the demanded steer angle ($\beta$f) is measured by the steering sensing means 17 and this information is transmitted to the microprocessor 18. The microprocessor 18 is programmed to produce control signals to control the movement of the hydraulic actuators 19 attached to the rear wheels 13, 14 as a function of the demanded front steer angle ($\beta$f) and uses the yaw rate (r) measured by the yaw rate sensor 20 to control the process. The rear wheels 13, 14 are moved to a required rear steer angle ($\beta$r). FIG. 4 shows a block diagram of the control system, the algorithm for which is as follows:

$$\beta r = KyG^*(\beta f^* Ky1 - r^*(Ky2 + kdr^* f(R))) \tag{1}$$

Ky1=steady state gain, which is the demanded yaw rate, is a function of the particular algorithm in operation Ky2=yaw rate feedback gain. This is a multiplier on yaw rate feedback, and is used for scaling KyG=yaw rate error loop gain. Increasing KyG will increase the maximum achievable response of the system and reduce the steady state error between the demanded yaw rate and achieved yaw rate. It will, however, also increase the likelihood of overshoot or oscillations in yaw rate Kdr=yaw acceleration feedback loop gain. Yaw acceleration is used to improve the stability of the system. The signal can be derived either from 2 axle accelerometers or by differentiating the yaw rate signal f(R)=differentiator (to give acceleration)

Thus the demanded front steer angle ($\beta$f) becomes a yaw rate demand after multiplication by the gain term Ky1.

The yaw rate sensor 20 measures the yaw rate (r) of the vehicle 10 as a whole to check whether the achieved response of the vehicle matches the demanded response (which is a function of $\beta$f), and the error therebetween is used to control further calculations by the microprocessor 18.

Use of the yaw acceleration feedback loop (Kdr) has been found to improve the stability of the system when critical values of yaw rate error loop gain (KyG) are used.

The yaw rate error control system can be used in a number of different ways, of which two are described below. A third is yaw velocity error. In these three separate closed loop algorithms implemented. The output to the yaw error loop (Ky1) is the sum of the three algorithms. The algorithms can therefore be invoked separately, by setting the relevant gains to zero; or a demanded yaw rate can be formed which is a combination of the three.

(i) Constant Path Demand

In this system of yaw rate error control the input to the control loop is the yaw rate (r) and the speed of the vehicle (V) measured by the speed sensor 22. The system equation is simplified to:

$$\beta r = KyG^*(rdem - r^*Ky1) \tag{2}$$

where
  rdem = $\beta f^* V^* Ky1$
  rdem = demanded yaw rate
  r measured yaw rate
  V vehicle speed
  Ky1 Steady state path gain In this system the demanded front steer angle ($\beta f$) is modified to represent a path demand, i.e. by multiplying the demanded front steer angle ($\beta f$) signal by the gain term (Ky1) and the vehicle speed, a yaw rate demand (rdem) is produced which represents a constant demanded vehicle path demand.

(ii) Constant Lateral Acceleration Demand

This algorithm demands a yaw rate (r) such that the high speed lateral acceleration is constant, to improve vehicle stability.

In this system of yaw rate error control the input to the control loop is again the yaw rate (r), but the front steer angle ($\beta f$) is modified to be a lateral acceleration demand. The vehicle lateral acceleration (ny) is measured by the accelerometer 3. Hence by supplying the system which is characterized by equation (1), the following system equation is obtained:

$$\beta r = KyG^*(rdem - r^*Ky1) \tag{3}$$

where
  rdem = $\beta f^* Ky1/V$
and
  r = ny/V
  rdem = demand yaw rate
  r = measured yaw rate
  ny = lateral acceleration
  V = Vehicle speed
  Ky1 = desired steady state lateral acceleration steering gain (acceleration per unit steer angle)

In this case the demanded yaw rate (rdem) is inversely proportional to the vehicle speed (V), and is therefore infinite at zero speed. Since this condition cannot be determined in the control unit 18 and would cause rapid changes in rear steer angle ($\beta r$) at low speed (V) the relationship of Ky1 to speed (V) is preferably as shown in the solid line of the graph of FIG. 5, i.e. the value of the lateral acceleration steering gain (Ky1) is limited to a predetermined maximum value (Kypg1) for very low vehicle speeds.

As an alternative to using yaw rate as the means of feedback control, it is possible to derive a control strategy on the basis of a lateral acceleration error loop. One such control scheme is described below.

Lateral Acceleration Error Loop

The control strategy for this variation is shown in the block diagram of FIG. 6, where;

$$\beta r = K1G^*(\beta f^* K11 - ny^* K12) \tag{4}$$

K11 = steady state gain
  K12 = lateral acceleration feedback gain
  K1G = lateral acceleration error loop gain
  ny = vehicle lateral acceleration Once an appropriate loop gain (K1G) has been determined this can be used to provide a variety of forms of control by deriving a suitable relationship between the demanded front steer angle ($\beta f$) and demanded lateral acceleration (ny).

A lateral acceleration error loop control system can be used, for example, as a fail-safe reserve control system in a vehicle having both a yaw rate gyrometer and a lateral accelerometer.

Although all the systems described herein use the demanded front steer angle ($\beta f$) as measured by steering sensing means 17, it is envisaged that the sensing means 17 could be a torque transducer measuring the torque applied to the steering wheel 15 or a sensor measuring the movement or position of the steering wheel 15. With appropriate adjustments to the microprocessor 18 the control systems could be used with torque, position or movement inputs rather than angle.

As is well known, the ride quality of a motor vehicle is improved if any wheel is able to move rearwardly, assuming forward motion of the motor vehicle, on hitting a bump, the biggest improvement being to the impact harshness of the suspension or secondary ride.

It is possible to provide for such movement of a wheel by the use of longitudinally compliant members in the suspension system of the motor vehicle, but it is generally essential to ensure that on such movement of a wheel there is no steering of the wheel resulting from such movement, since any such steering of the wheel can introduce undesirable instability and control characteristics to the motor vehicle.

Known suspension systems are multi-link arrangements with precisely engineered pivot points to provide the required kinematic characteristics and longitudinal (and lateral) compliance, and are thus relatively expensive to manufacture.

A particular advantage of the steering system of this invention is that since the movement of each wheel is continuously sensed and controlled any undesirable movements of a wheel can be corrected, and thus the system allows the introduction of compliance as discussed above without the need for very high precision in the manufacture of the suspension system of the vehicle. Thus, a wheel can be permitted to move rearwardly on impact to obtain improved ride quality while any errors in the movement of the wheel, for example undesired steering, will be corrected by the steering system.

Input Filtering

Figure 7:
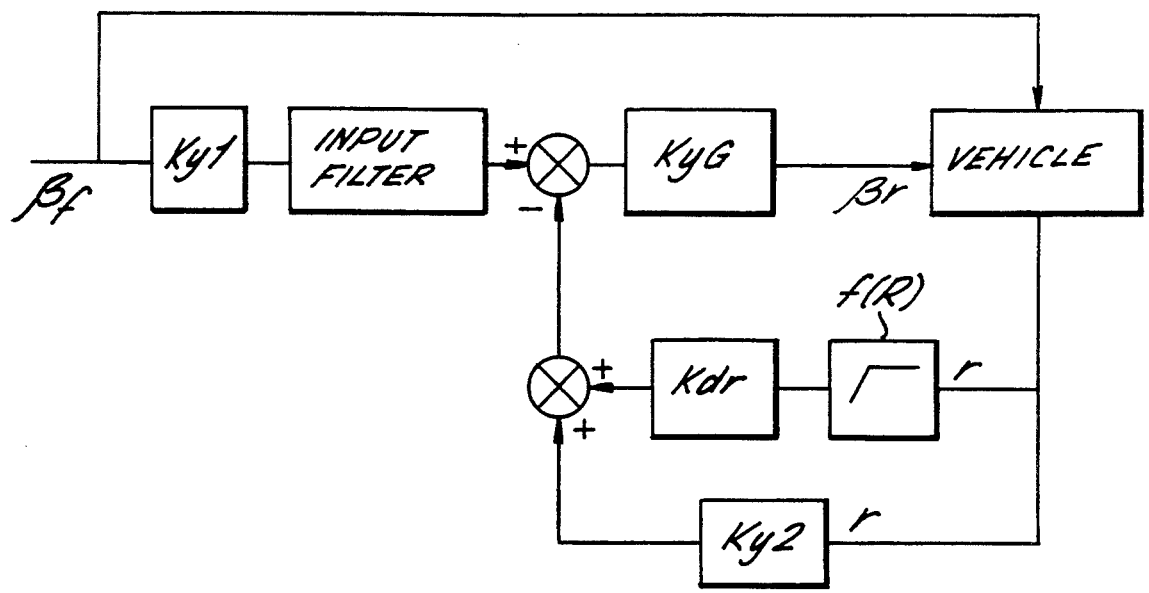
FIG. 7 is a block diagram for a further embodiment of the closed loop control system incorporating an input filter.
Figure 8:
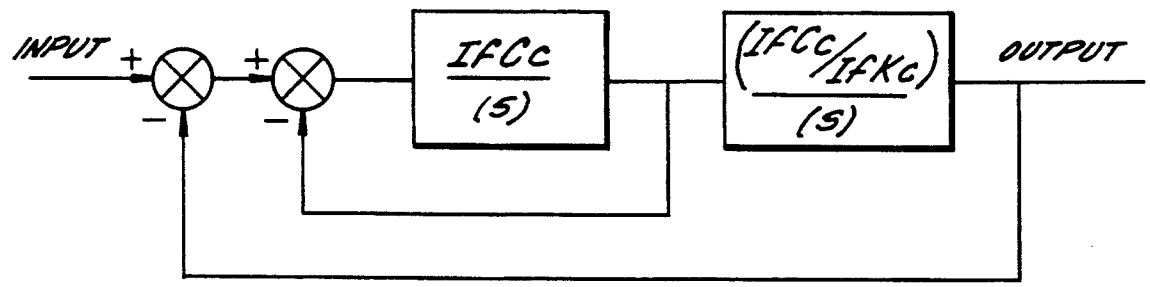
FIGS. 8 and 9 are block diagrams of the input filter details of FIG. 7.
Figure 9:
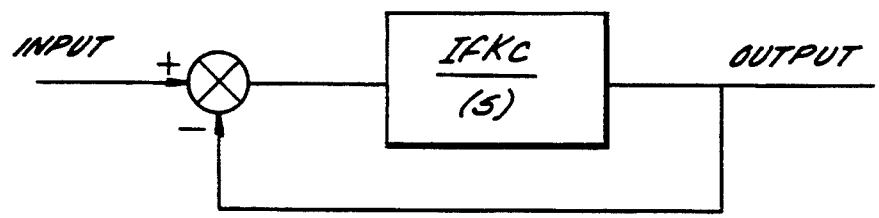

The control system may be improved by the addition of an "input filter" as shown in FIGS. 7-9. The previously described system was found to be too responsive to the driver during normal road driving. The filter decreases the response times to the driver and external disturbances and enables the driver's input to be shaped to the desired vehicle response.

The input filter describes the required vehicle performance and depending on the system can be made sensitive to vehicle and tire combinations but less sensitive to changes in operating or road conditions according to driver requirements.

The input filter is basically a second order filter with stiffness and damping. It can be considered as a simple vehicle model which defines the desired yaw response in terms of a frequency and damping ratio. The filter is applied to the measured front and steer angle in the forward path of the control algorithm and can be used to programe the desired vehicle response without affecting the closed loop performance. The input filter gives the driver the ability to tune the vehicle response to his or her required level and must therefore be evaluated subjectively. Generally it has been found that drivers prefer a frequency of about 4 hertz with 0.9 damping ratio for road use and 5–6 hertz with 0.65 damping ratio for track use. These figures however vary from driver to driver. It has been found in tests also that a particular driver tends to optimize the controller parameters to give the same vehicle response at all speeds.

Referring now to FIG. 8, when the input filter frequency (IFKc) does not equal zero and the input filter damping (IFCc) does not equal zero the two pole filter with stiffness and damping of FIG. 8 is preferred. If the input filter damping (IFCc) equals zero but the input filter frequency (IFKc) does not equal zero then the one pole filter of FIG. 9 with a time constant can be used.

With this filter unit the graph of FIG. 5 follows the dotted line for speeds (V) below IVmin. At low speeds IV is a linear function of speed. The slope can be varied using Kmin and is used to alter the low speed handling of the vehicle. This ensures that the rear wheels never steer more than the front wheels and that the steering effect at the back is never greater than at the front, which if allowed would promote undesirable vehicle motions in response to front wheel steering inputs.

A high gain loop system should be capable of responding and correcting for external disturbances applied to the vehicle e.g. cross winds and split mu conditions. In tests carried out on the system described above on a split mu surface of polished ice (mu less than 0.1) and snow (mu greater than or equal to 0.45) with a vehicle fitted with an ABS system, the driver work load and vehicle disturbance is significantly reduced in a four wheel steer case, thus improving the true stability of the vehicle. In such a situation the vehicle control system compensates for the difference between the drivers demanded response e.g. that the vehicle continues in a straight line, and the affect of the split mu surface on the wheels, say, during braking when the vehicle would tend to spin, to ensure that the vehicle continues in a straight line. This type of system can be used in conjunction with an ABS system to reduce the need for a select low system, as the rear steer can be used to react to any yaw moment induced by the brake system.

Thus the application of a closed loop control strategy can provide increased vehicle response above the normal driver requirements; consistent vehicle handling characteristics over the whole operating speed range of the vehicle; improved vehicle stability and control in response to external disturbances and interaction with other systems such as Active Suspension and ABS to provide improved vehicle safety in extreme conditions.

Although the present invention has been described with reference to preferred embodiments, workers skilled in the art will recognize that change may be made in form and detail without departing from the spirit and scope of the invention.

What is claimed is:

1. A wheeled vehicle steering system comprising:
   adjustable steering means;
   means for generating a first electrical signal proportional to the demanded input of the steering input means;
   means for steering a vehicle wheel in response to said first electrical signal;
   sensing means for detecting the response of the vehicle;
   means for producing a second electrical signal proportional to said detected response;
   wherein the means for steering the vehicle wheel in response to said first electrical signal comprises:
   an input filter for filtering the first electrical signal;.
   comparator means for comparing the filtered first electrical signal and the second electrical signal and for producing a difference signal from comparison of the filtered first electrical signal and the second electrical signal; and
   means for steering the first vehicle wheel in response to said difference signal.

2. A wheeled vehicle steering system as claimed in claim 1, in which the steering input means is rotatable, and the means for generating the first electrical signal comprises means for measuring the angle of rotation of the steering input means.

3. A wheeled vehicle steering system as claimed in claim 1, in which the sensing means for detecting the response of the vehicle comprises means for measuring the yaw rate of the vehicle and producing an electrical signal proportional thereto.

4. A wheeled vehicle steering system as claimed in claim 3, wherein the means for steering the first vehicle wheel comprises means for processing the electrical signal proportional to the yaw rate to permit comparison in the comparator means with the filtered first electrical signal; and means for producing a difference signal from the comparison of the filtered first electrical signal and the electrical signal proportional to the yaw rate.

5. A wheeled vehicle steering system as claimed in claim 1 claim, comprising means for measuring the vehicle speed and producing an electrical control signal proportional thereto.

6. A wheeled vehicle steering system as claimed in claim 5 wherein the means for steering the vehicle wheel comprises means for multiplying the first electrical signal by a gain which varies with variation in the electrical signal proportional to vehicle speed.

7. A wheeled vehicle steering system as claimed in claim 1, in which the sensing means for detecting vehicle response comprises means for measuring lateral acceleration of the vehicle and producing an electrical signal proportional thereto.

8. A wheeled vehicle steering system as claimed in claim 7, wherein the means for steering the first vehicle wheel comprises means for processing the electrical signal proportional to the lateral acceleration of the vehicle to permit comparison in the comparator means with the filtered first electrical signal; and means for producing a difference signal from comparison of the filtered first electrical signal with the electrical signal proportional to the lateral acceleration of the vehicle.

9. A wheeled vehicle steering system as claimed in claim 1, in which the sensing means for detecting vehicle response comprises means for measuring yaw acceleration of the vehicle and producing an electrical signal proportional thereto.

10. A wheeled vehicle steering system as claimed in claim 9, wherein the means for steering the first vehicle wheel comprises means for processing the electrical signal proportional to the yaw acceleration of the vehicle to permit comparison in the comparator means of the electrical signal proportional to the yaw acceleration of the vehicle with the filtered first electrical signal; and means for producing a difference signal from comparison of the filtered first electrical signal with the electrical signal proportional to the yaw acceleration of the vehicle.

11. A wheeled steering system as claimed in claim 1 wherein the means for steering the vehicle wheel is operable to steer a rear wheel of a vehicle having at least one front wheel and at least one rear wheel.

12. A wheeled vehicle steering system as claimed in claim 1, wherein the input filter comprises a second order filter.

13. A wheeled vehicle steering system as claimed in claim 1, wherein the input filter comprises a single pole filter.

* * * * *

UNITED STATES PATENT AND TRADEMARK OFFICE
CERTIFICATE OF CORRECTION

PATENT NO. : 5,348,111
DATED : September 20, 1994
INVENTOR(S) : David A. Williams et al.

It is certified that error appears in the above-indentified patent and that said Letters Patent is hereby corrected as shown below:

```
Column 8, Line 49 (Claim 5, Line 2) after "1",
cancel "claim".
```

Signed and Sealed this

Sixth Day of December, 1994

Attest:

BRUCE LEHMAN

*Attesting Officer*     *Commissioner of Patents and Trademarks*